July 18, 1961     H. D. MADSON     2,992,800
PIPE HANGER
Filed April 1, 1960
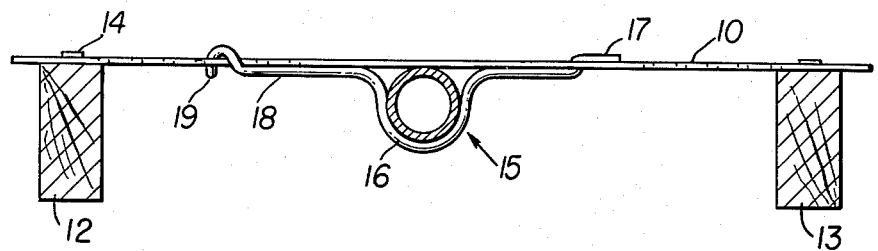
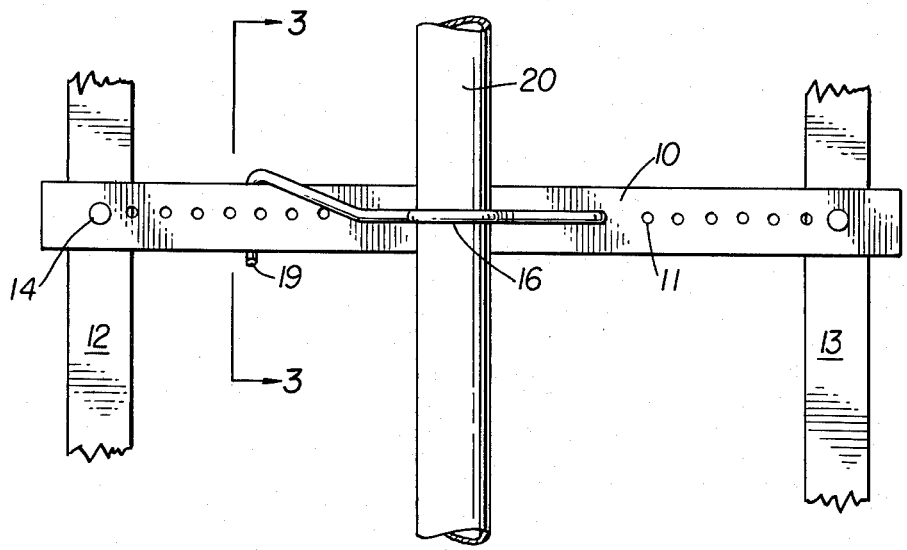
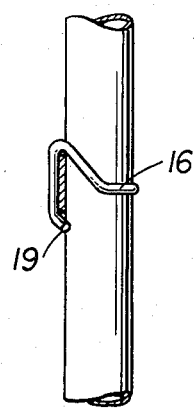
INVENTOR
HUGH D. MADSON
BY Fulwider, Mattingly & Huntley
ATTORNEYS

United States Patent Office 2,992,800
Patented July 18, 1961

2,992,800
PIPE HANGER
Hugh D. Madson, 303 47th St., San Diego, Calif.
Filed Apr. 1, 1960, Ser. No. 19,291
1 Claim. (Cl. 248—74)

My invention relates to supporting brackets and has particular reference to a pipe hanger for thin wall tubing, such as copper pipe. A great many domestic plumbing installations use thin wall copper tubing for water systems in place of the heretofore rigid type of galvanized pipe. Such thin wall copper tubing has the advantage of ease of installation and labor saving on such installations but is subject to the defect and disadvantage of being relatively flexible and difficult to hold and secure in position.

One of the objects of my invention is to provide a simple, quick and easy means for securing such thin wall copper tubing in any desired position after installation.

Most copper tubing installed in modern housing incorporates special elbows having lateral flanges, which said flanges may be secured to wooden headers cut between studdings to secure the pipe in position, whenever it turns outwardly to extend through a wall for a shower head or other outlet. Such fittings not only are expensive but a great deal of time is consumed in cutting the wooden headers between the upright studs.

A further object of my invention is to provide a hanger to support such water outlets in the desired position, which is relatively inexpensive and can be quickly and efficiently mounted on the studding.

I am aware that other efforts have been made to provide such pipe hangers. Most of them have involved rather complex clamping devices which not only are relatively expensive but time consuming in their application. Still a further object of my invention is to provide a pipe hanging device which can be quickly and easily attached to the studding in any desired position and which can quickly and easily grip a copper tubing in the desired preselected position by an inexpensive spring like clip.

In the construction of a house, by the time the plumber arrives to install the water pipes, after the floor and framing has been installed, relatively wide variances are found with respect to the position of studs and the floor joists so it is not always possible to have water outlets emerging in fixed positions with respect to studdings and other solid supports. It is almost universally necessary to have the water outlet emerging from a wall at some indefinite point between the solid studdings. Such condition makes the support of such piping an indiscriminate, indefinite matter. It therefore becomes necessary to employ a hanging means which will support the pipe in the desired position regardless of the position of the studding within wide limits.

Also included among the objects of my invention is the purpose of providing a universal pipe supporting hanger which can be quickly and easily secured between adjoining studs and which will grip the copper pipe in the desired position within relatively narrow limits and to a very close tolerance.

Also important among the objects of my invention is the production of a satisfactory pipe hanger which is relatively inexpensive to produce and yet which will effectively hold the pipe in the desired position.

These and other objects and advantages will become apparent from the following specification and the drawings illustrative thereof.

In the drawings:

FIG. 1 is a top plan view of a pipe hanger embodying the principles of my invention.

FIG. 2 is a side elevation taken on line 2—2 of FIG. 1.

FIG. 3 is a sectional view taken on line 3—3 of FIG. 2.

Referring now in more specific detail to the structure and use of my invention, it will be noted that I have provided a horizontally disposable bar 10 having a plurality of apertures 11 formed therethrough, either by punching or drilling. The bar 10 is adapted for installation between standard, upright wall studs such as 12 and 13 and secured thereto by such fastening devices as nails 14.

In view of the fact that the bar 10 is provided with a great number of spaced apertures 11, its horizontal position with respect to the studs 12 and 13 is not too important and an aperture will always be found in position to receive the nails 14.

Pipe gripping means such as a clamp designated generally by the numeral 15 is composed of three (3) basic portions: A pipe encircling portion 16, a locking foot member 17, and a hook end 18.

The pipe encircling member merges into the foot 17 which is bent at right angles to said pipe encircling member. The foot 17 is inserted through one of the apertures 11 and the entire pipe gripping member 15 is then rotated counterclockwise to the position illustrated in FIG. 1 thereby preventing the foot 17 from being withdrawn from the respective aperture.

The other end of the pipe encircling member 16 merges into a hooking member which is bent slightly upward and backwardly to a downwardly extending tongue 19.

After inserting the foot 17 through one of the apertures and rotating the assembly counterclockwise to grip a pipe such as 20, the hooking member 18 is sprung upwardly and backwardly until the tongue 19 is behind the bar 10 and the hooking member is then pushed downwardly so that the tongue 19 hooks behind the bar 10.

In usual practice of using my invention, it is preferred to engage the pipe as just illustrated before securing the bar 10 to the studs 12 and 13. By this manner it is possible to grip the pipe and place the pipe in the exact desired position before securing the bar. Once the bar is secured to the studs 12 and 13 the pipe 20 cannot move in any direction.

Thus it will be seen that I have provided a relatively inexpensive and effective pipe supporting hanger for holding relatively thin wall pipes and tubing in any desired position and which can be quickly and easily installed without the use of any special tools.

Whereas I have described my invention in what I consider one of its more preferred embodiments, it will be clear to those familiar with the art that a great many modifications can be made and that the scope of my invention should not be confined to the specific details illustrated but should be accorded the full scope of the equivalent as set forth in the appended claim.

I claim:

A pipe hanger comprising in combination, a rigid bar having a front side and a rear side and formed with a plurality of longitudinally spaced apertures, said bar being adapted for connection across and disposed transversely of building frame member; a pipe clamp consisting of a resilient wire, said wire including a semi-circular portion adapted to bear against a pipe disposed transversely of and on the front side of the bar and one end of the semi-circular portion merging into a portion extending rearwardly through one of said apertures, said extending portion merging into a foot portion extending away from the semi-circular portion and lying against the rear side of the bar, the other end of the semi-circular portion merging into a portion and extending therefrom in a direction opposite the foot portion and lying against the front of the bar, said latter portion and the semi-circular and foot portions lying longitudinally of the bar, said latter portion merging into a transversely disposed portion extending away from the semi-circular portion, said transversely disposed portion extending to a side edge of the bar and merging into a rearwardly extending portion, said rearwardly extending portion merging into a portion embracing the rear of the bar and extending transversely across the same and terminating into a forwardly extending portion adjacent and below the opposite edge of the bar.

References Cited in the file of this patent

UNITED STATES PATENTS

| | | |
|---|---|---|
| 2,712,917 | Flora | July 12, 1955 |
| 2,843,230 | Nelsson | July 15, 1958 |
| 2,884,221 | Messier | Apr. 28, 1959 |

FOREIGN PATENTS

| | | |
|---|---|---|
| 145,256 | Great Britain | July 2, 1920 |